May 21, 1968      R. D. LOCHNER      3,384,795
FERRO-PLASTIC CONTROL DEVICES
Filed June 10, 1966
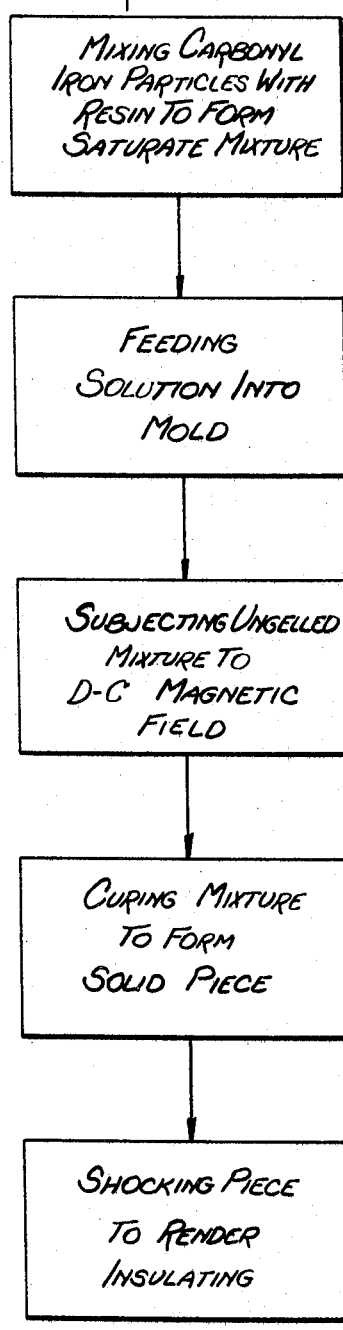
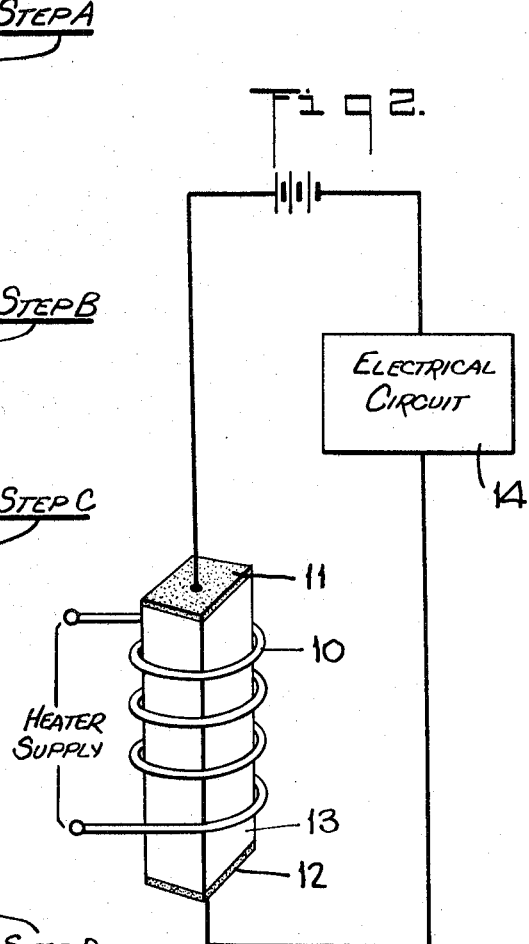
INVENTOR.
RAYMOND D. LOCHNER
BY
ATTORNEY

United States Patent Office 3,384,795
Patented May 21, 1968

3,384,795
FERRO-PLASTIC CONTROL DEVICES
Raymond D. Lochner, Annapolis, Md., assignor to Trident Engineering Associates, Inc., Annapolis, Md., a corporation of Maryland
Continuation-in-part of application Ser. No. 217,655, Aug. 17, 1962. This application June 10, 1966, Ser. No. 556,771
7 Claims. (Cl. 317—262)

This invention relates generally to ferro-plastic control devices, and more particularly to a device whose electrical resistance characteristics may be radically altered from a conductive to a non-conductive state to carry out control functions. This application is a continuation-in-part of the co-pending application Ser. No. 217,655, filed Aug. 17 1962, now Patent No. 3,255,512.

In the above-identified co-pending application, there is disclosed a high-permeability, ferro-plastic material which is fabricated by a casting technique wherein carbonyl iron particles are mixed in a plastic solution, preferably an epoxy resin, to provide a mixture which may be molded into any desired configuration.

The principal object of the present invention is to provide control devices making use of such ferro-plastic material, which devices may be rendered electrically conductive or insulating, as desired.

More specifically, it is an object of the invention to provide a material constituted by a saturate mixture of carbonyl iron particles in a plastic insulating medium, which may be made conductive by subjecting the material to an electromagnetic field whose strength is sufficient to orient the molecules of said particles, and which may be made non-conductive by subjecting the same material to a shock of sufficient strength to disorient the particles.

A significant feature of the invention is that it makes possible a solid-state control device usable in power and filter circuits for switching and for other control functions, as well as for a variety of other purposes. The material in accordance with the invention is also usable as a shock detector, for its internal resistance reflects the degree to which it has been subjected to shock forces.

For a better understanding of the invention as well as other objects and further features thereof, reference is made to the following detailed description to be read in conjunction with the accompanying drawing, wherein:

FIG. 1 is a flow chart showing the steps by which the material is made in accordance with the invention and thereafter modified in terms of conductivity; and FIG. 2 is a section taken through a control device made of said material.

The first step in making a ferro-plastic material in accordance with the invention is identified as step A in FIG. 1, wherein carbonyl iron particles are mixed with resinous material to form a saturate solution.

Carbonyl iron powder is commercially prepared by decomposing iron carbonyl ($Fe[CO]_5$) in the vapor phase, and it consists of extremely small particles which are almost perfect spheres. The particle size distribution can be controlled in practice by temperature, pressure and other operation conditions, and may vary from about 3 to 20 microns. Spheroid particle sizes up to 60 microns may be conveniently used. Among the powders usable are those manufactured by General Aniline & Film Company (Dyestuff and Chemical Division) as 6AF Carbonyl Iron Powder #E/B 375–2PQ–01.

These powders are mixed with a thermosetting resin such as epoxy or phenolic resins which are commercially available. Many of these resins cure at room temperature, and in producing articles in accordance with the present process, the carbonyl iron powder and resin are preferably thoroughly mixed in a chemist's mortar. In practice, a standard epoxy may be used, such as Ciba 502 resin with Ciba 951 hardener.

The invention is not limtied to epoxy, and similar results may be obtained with polymers such as polyesters, urethane rubber, and with phenolics. Polymers or monomers may be used with injection molding techniques for shaping the material.

Because of the spherical shape of the carbonyl iron particles, very high packing ratios can be obtained without difficulty. The greatest theoretical concentration for carbonyl iron spheres is 76.4% carbonyl iron by volume. In practice, upwards of 70% carbonyl iron by volume has been produced, thus approaching the maximum possible to produce a product having good insulation properties, high thermal conductivity, high permeability, as well as excellent mechanical characteristics.

After the carbonyl iron and epoxy resin are thoroughly mixed to form a saturate solution, the resultant product is comparatively dry. Just prior to use, the proper proportions of hardener are added, resulting in a high-viscosity mixture which in step B is poured or injected into a mold having the desired shape for the device to be produced.

It has been found that the mixture of resin and carbonyl iron will hold up and maintain its moldable qualities for a considerable period if it is protected from air and moisture by means of a suitable package. Then when a quantity of the mixture is to be used, hardener is added as needed just before injecting or feeding the mixture into the mold.

In order to orient the magnetic characteristics of the carbonyl iron, the mixture in the mold while still ungelled is subjected in step C to a strong direct-current electromagnetic field. As with most magnetic materials, carbonyl iron crystals are most easily magnetized along one particular crystallographic direction or axis, and the magnetic field acts to orient the particles while they are still free to move in the plastic solution so that as many of them as possible have their directions of easy magnetization aligned in the direction of the field. In a sense, the resultant material may be said to be grain-oriented, and it has been found that such grain-orientation significantly augments the permeability of the material and at the same time imparts an electrically-conductive characteristic thereto.

It has been found that higher values of conductivity may be obtained by centrifuging the mixture in a magnetic field. When, however, the mixture is centrifuged in the absence of a magnetic field, its electrical resistance is extremely high.

In step D, the mixture is then allowed to cure, the cure time, which may for example be 24 hours, depending on the temperature and the proportions of hardener used. The resultant material has a hard, greyish-black consistency with a Brinnell or Rockwell characteristic similar to epoxy resin, but slightly more brittle and readily machinable.

The hardening material consists of spheres of carbonyl iron in an insulating matrix of epoxy. Since the individual spheres are of magnetically soft material which are microscopically separated from each other, in effect a laminated structure is produced having low eddy current and iron losses.

It has been found that by the step of orienting the carbonyl particles, the electrical resistance of the ferro-plastic material can be rendered effectively conductive. Thus in one treated sample, the electrical resistance was measured at less than 6 ohms per inch, in a second at less than 15 ohms per inch, and in a third at less than 60 ohms per inch. It has also been found that the resistance of the material is directional in nature, for when measured in a direction perpendicular to that of the applied magnetic field, the resistance is appreciably greater than the resistance parallel to the field.

It has also been found that by subjecting the ferro-plastic material having conductive characteristics to sufficient shock (step E), which may be thermal or mechanical in form, the material is rendered highly resistive, with a resistance running in some instances into the megohm range. Thus in one sample, the resistance of the material after shock was 7.4 megohms per inch, in another, 12 megohms per inch, and in still another, 15.5 megohms per inch.

The material lends itself to electroplating or other forms of plating to apply terminals thereto. Thus, as shown in FIG. 2, the ends of a bar 10 of ferro-plastic material in accordance with the invention, are coated with a silver solution to produce a pair of uniform contacts 11 and 12. In electroplating, the bar 10 is coated when in the conductive state, in which condition it is capable of acting as an electroplating cathode.

This material may be made initially conductive in the manner previously described, and thereafter be rendered non-conductive, as by means of heat applied through an electric heating coil 13 surrounding the bar. The original conductive characteristic can be restored by subjecting the material to a strong direct-current electromagnetic field at ambient temperature.

Thus by placing the solid-state device shown in FIG. 2 in an electrical circuit 14, the device initially acts as a conductive, and by thereafter subjecting it to thermal or mechanical shock, it acquires the characteristics of an insulator to interrupt the flow of current. In other instances, the material has high permeability, so that the material may at the same time act as a permeability element in an electromagnetic system.

The device shown in FIG. 2 is capable of acting not merely as a circuit breaker, but also as a shock detector. For example, in shipping costly gyro or stable platforms for inertial guidance systems, it is important to know whether the equipment in the course of transportation was subjected to shock which might result in possible damage. By including the shock-sensitive material in the shipping box and testing the resistance of this material upon arrival, one is able to tell the extent to which the box and its contents were subjected to shock.

While there has been shown and described a preferred example of ferro-plastic control device in accordance with the invention, it will be appreciated that many changes and modifications may be made therein without, however, departing from the essential spirit of the invention as defined in the annexed claims.

What I claim is:

1. The method of changing the electrical conductivity of a ferro-plastic device formed by a mixture of carbonyl iron particles in a resin solution, comprising the steps of subjecting the mixture in the ungelled state to an electromagnetic field to orient the particles therein, curing the treated mixture to form a device having high conductivity, and subjecting the device to shock to render it non-conductive.

2. The method as set forth in claim 1, wherein the shock is thermal in character.

3. The method as set forth in claim 1, wherein the shock is mechanical in character.

4. The method as set forth in claim 1, further including the step of plating conductive terminals on said device when it is in the conductive state.

5. A solid-state device whose electrical conductivity may be radically altered, said device comprising a conductive body formed of magnetically oriented carbonyl iron particles imbedded in a cured resin matrix, and means to subject said body to a shock of sufficient intensity to disorient said particles to render said body non-conductive.

6. A protective circuit including a device as set forth in claim 5, in series with an electrical supply and a load to disconnect said supply when said body is shocked.

7. A shock detector comprising a body formed of magnetically oriented carbonyl iron particles imbedded in a cured resin matrix, said body having a relatively high conductivity which is reduced by shock forces to reflect same.

References Cited

UNITED STATES PATENTS

| | | | |
|---|---|---|---|
| 2,849,312 | 8/1958 | Peterman | 29—608 X |
| 2,999,271 | 9/1961 | Falk et al. | 18—16.5 |
| 2,999,275 | 9/1961 | Blume | 29—608 X |
| 3,041,566 | 6/1962 | Cloud | 338—32 |
| 3,070,841 | 1/1963 | Schornstheimer | 29—607 X |
| 3,110,675 | 11/1963 | Brailowsky | 29—607 X |
| 3,163,922 | 1/1965 | Brailowsky | 29—608 |

MILTON O. HIRSHFIELD, *Primary Examiner.*

J. A. SILVERMAN, *Assistant Examiner.*